(12) United States Patent
Muller et al.

(10) Patent No.: US 12,433,306 B2
(45) Date of Patent: Oct. 7, 2025

(54) DEVICE FOR ION CAPTURE

(71) Applicant: NO-DIUM LLC, Lake Charles, LA (US)

(72) Inventors: Dyllan Christopher Muller, Little Elm, TX (US); Austin Reid Wolf, Lake Charles, LA (US)

(73) Assignee: NO-DIUM LLC, Lake Charles, LA (US)

( * ) Notice: Subject to any disclaimer, the term of this patent is extended or adjusted under 35 U.S.C. 154(b) by 775 days.

(21) Appl. No.: 17/593,670

(22) PCT Filed: Mar. 23, 2020

(86) PCT No.: PCT/US2020/024182
§ 371 (c)(1),
(2) Date: Sep. 22, 2021

(87) PCT Pub. No.: WO2020/198124
PCT Pub. Date: Oct. 1, 2020

(65) Prior Publication Data
US 2022/0174993 A1 Jun. 9, 2022

Related U.S. Application Data

(60) Provisional application No. 62/822,799, filed on Mar. 23, 2019.

(51) Int. Cl.
*A23L 5/20* (2016.01)
*A23L 2/80* (2006.01)
*B01D 69/06* (2006.01)
*B01D 69/02* (2006.01)

(52) U.S. Cl.
CPC ............... *A23L 5/273* (2016.08); *A23L 2/80* (2013.01); *B01D 69/061* (2022.08); *B01D 69/02* (2013.01)

(58) Field of Classification Search
CPC ... A23L 2/80; A23L 5/273; B01D 69/00; B01D 69/02; B01D 69/12; B01D 69/061
USPC .................................................. 99/495, 505
See application file for complete search history.

(56) References Cited

U.S. PATENT DOCUMENTS

| | | | |
|---|---|---|---|
| 5,670,381 A | 9/1997 | Jou et al. | |
| 8,574,503 B2 * | 11/2013 | Satoh | C02F 1/68 422/162 |
| 8,877,255 B2 | 11/2014 | Keyser et al. | |
| 9,296,611 B2 | 3/2016 | Wong | |
| 2008/0282908 A1 * | 11/2008 | Cole | A23L 2/78 99/495 |
| 2012/0145640 A1 | 6/2012 | Davis et al. | |
| 2014/0158623 A1 | 6/2014 | Pudil et al. | |
| 2014/0217024 A1 | 8/2014 | Monzyk et al. | |
| 2015/0166375 A1 | 6/2015 | Freydina et al. | |

OTHER PUBLICATIONS

International search report for PCT/US2020/024182 mailed Jun. 16, 2020.
International written opinion for PCT/US2020/024182 mailed Jun. 16, 2020.

(Continued)

*Primary Examiner* — Reginald Alexander
(74) *Attorney, Agent, or Firm* — Baker, Donelson, Bearman, Caldwell & Berkowitz, P.C.

(57) ABSTRACT

The invention is directed to ion capture devices and methods for ion capture.

21 Claims, 15 Drawing Sheets

(56) References Cited

OTHER PUBLICATIONS

Nakajima, Yasushi, and Isao Yoshida. "Sodium selective ion-exchange properties of zirconium phosphate, HZr2 (PO4) 3, and its application for the removal of sodium ions." Analytical sciences 12.6 (1996): 935-940.
Title 21, Chapter I, Subchapter B, part 184 of the Code of Federal Regulations.
"Heart Disease Facts & Statistics." Centers for Disease Control and Prevention, Centers for Disease Control and Prevention, Nov. 28, 2017, www.cdc.gov/heartdisease/facts.htm.
"Improving Nutrition." Unilever Global Company Website, Unilever, www.unilever.com/sustainable-living/improving-health-and-well-being/improving-nutrition/.
Health Risks and Disease Related to Salt and Sodium" The Nutrition Source" Harvard School of Public Health, Jul. 6, 2016, www.hsph.harvard.edu/nutrit10nsource/salt-andsod1um/sodium-health-risks-and-disease/.
Alamo, James, and Rustum Roy. "Crystal chemistry of the NaZr 2 (PO 4) 3, NZP or CTP, structure family." Journal of materials science 21.2 (1986): 444-450.
Hawkins, H. T., et al. "Synthesis and characterization of uranium (IV)-bearing members of the [NZP] structural family." Chemistry of materials 11.10 (1999): 2851-2857.
Di, Takao, et al. "Synthesis of Zirconium Phosphate, HZf2(P04)3, in Pores of Silica Beads and Some Ion Exchange Separation Properties of the Composite Obtained." Separation Science and Technology 44.15 (2009): 3679-3697.
Zhou, Bin, et al. "Worldwide trends in blood pressure from 1975 to 2015: a pooled analysis of 1479 population-based measurement studies with 19-1 million participants." The Lancet 389.10064 (2017): 37-55.

\* cited by examiner

DEVICE FOR ION CAPTURE

This application claims priority from U.S. Provisional Application No. 62/822,799 filed on Mar. 23, 2019, the entire contents of which are incorporated herein by reference in its entirety.

All patents, patent applications and publications cited herein are hereby incorporated by reference in their entirety. The disclosures of these publications in their entireties are hereby incorporated by reference into this application in order to more fully describe the state of the art as known to those skilled therein as of the date of the invention described and claimed herein.

This patent disclosure contains material that is subject to copyright protection. The copyright owner has no objection to the facsimile reproduction by anyone of the patent document or the patent disclosure as it appears in the U.S. Patent and Trademark Office patent file or records, but otherwise reserves any and all copyright rights.

FIELD OF THE INVENTION

Aspects of the invention are drawn to ion capture devices and methods for ion capture.

BACKGROUND OF THE INVENTION

High sodium intake has been correlated with a higher risk of heart disease as well as other health problems. Buying low sodium foods can be prohibitively expensive or low sodium options do not provide as much variation as their high sodium counterparts.

SUMMARY OF THE INVENTION

An aspect of the invention is directed to an ion capturing device. In one embodiment, the device comprises a containment apparatus and a substance, wherein the substance is within the containment apparatus, and wherein the substance can capture one or more ions. In one embodiment, the ion comprises a monovalent or polyvalent ion. In another embodiment, the ion comprises a monovalent ion. In a further embodiment, the substance captures a sodium ion. In another embodiment, the substance captures an ion through chemical or physical means. In another embodiment, the substance captures an ion through ion-exchange, trapping ions within the crystal structure of the substance, adsorption, or chelation. In one embodiment, the substance comprises a compound of formula $M'M''_xA_2B_3O_{12}$ in NZP form. In some embodiments, the M' comprises a lithium ion, sodium ion, potassium ion, hydrogen ion, hydronium ion, rubidium ion, cesium ion, magnesium ion, calcium ion, strontium ion, barium ion, or mixtures thereof. In some embodiments, the M" comprises a sodium ion, potassium ion, hydrogen ion, hydronium ion, or mixtures thereof. In some embodiments, the A comprises tin, germanium, titanium, zirconium, hafnium, aluminum, chromium, nobium, tantalum, scandium, or mixtures thereof. In other embodiments, the B comprises phosphorous, silicon, aluminum, sulfur, or mixtures thereof. In some embodiments, "x" has a value of 0 to about 3. In one embodiment, the substance comprises hydrogen zirconium phosphate, $HZr_2(PO_4)_3$, or a similar substance. In a further embodiment, the substance comprises a powder, a granule, a crystal, a suspension, an emulsion, a solution, or a resin. In some embodiments, the granule comprises a spherical, cylindrical, disk-shaped, or other high surface area granule. In some embodiments, the substance is made by mixture with silica sol, silica beads, polymeric beads, or a gel. In one embodiment, the ion capturing device further comprises a buffering solution or buffering agent. In some embodiments, the containment apparatus is porous, semi-porous, permeable, or semipermeable. In one embodiment, the porosity is less than or equal to one nanometer. In one embodiment, the porosity is greater than about one nanometer. In some embodiments, the containment apparatus comprises fabric, plastic, a membrane, or metal. In one embodiment, the containment apparatus comprises a material through which an ion can pass. In one embodiment, the containment apparatus is rigid or non-rigid. In one embodiment, the containment apparatus is a bag (e.g., a cellulose bag). In some embodiments, the device comprises a spoon, dipstick, or stirring device. In some embodiments, the device is manufactured for use in a food or beverage. In other embodiments, the device is manufactured for use in the manufacture of a food or beverage.

An aspect of the invention is directed to methods of removing one or more ions from an ion-containing composition. In one embodiment, the method comprises placing the ion capturing device described herein into the ion-containing composition; agitating the ion capturing device within the ion-containing composition for a period of time sufficient to remove one or more ions; and removing the ion capturing device from the composition, thereby providing a composition with reduced ion content. In one embodiment, the ion comprises a monovalent ion or a polyvalent ion. In another embodiment, the ion comprises a sodium ion. In a further embodiment, agitating comprises stirring, shaking or spinning. In some embodiments, the period of time sufficient to remove one or more ions is at least about 30 seconds. In yet other embodiments, the method further comprises the step of discarding, reusing, or recharging the device. In some embodiments, the composition comprises an edible composition (e.g., a food or beverage). In one embodiment, recharging the device comprises agitating the device in a recharging solution to allow one or more ions to release from the substance. In some embodiments, the recharging solution is an acidic solution. In other embodiments, the acidic solution is about pH 3 or less.

Some embodiments can include an ion capture device, such as a sodium ion capturing device, consisting of a porous, semi-porous, permeable, or semi-permeable containment apparatus containing a substance that can selectively capture ions, such as sodium ions, for the removal from food or beverages. For example, the food or beverages can be liquid-containing food or beverages. For example, capture can refer to adsorption or chelation. In one embodiment, the porous, semi-porous, permeable, or semi-permeable containment apparatus is a bag; where a bag is a non-rigid container with an opening at the top. In one embodiment, the substance capable of sodium-selective capture of ions is hydrogen zirconium phosphate ($HZr_2(PO_4)_3$).

Some embodiments can include a method of removing ions, such as sodium ions, from foods and beverages. The method can include placing the above-described device in a food or beverage and stirring, shaking, or otherwise agitating the device inside the food or beverage until the desired level of ion removal has been reached. The bag or other containment apparatus can then be removed and discarded, reused, or recharged.

Other objects and advantages of this invention will become readily apparent from the ensuing description.

DETAILED DESCRIPTION OF THE INVENTION

Figure 1:
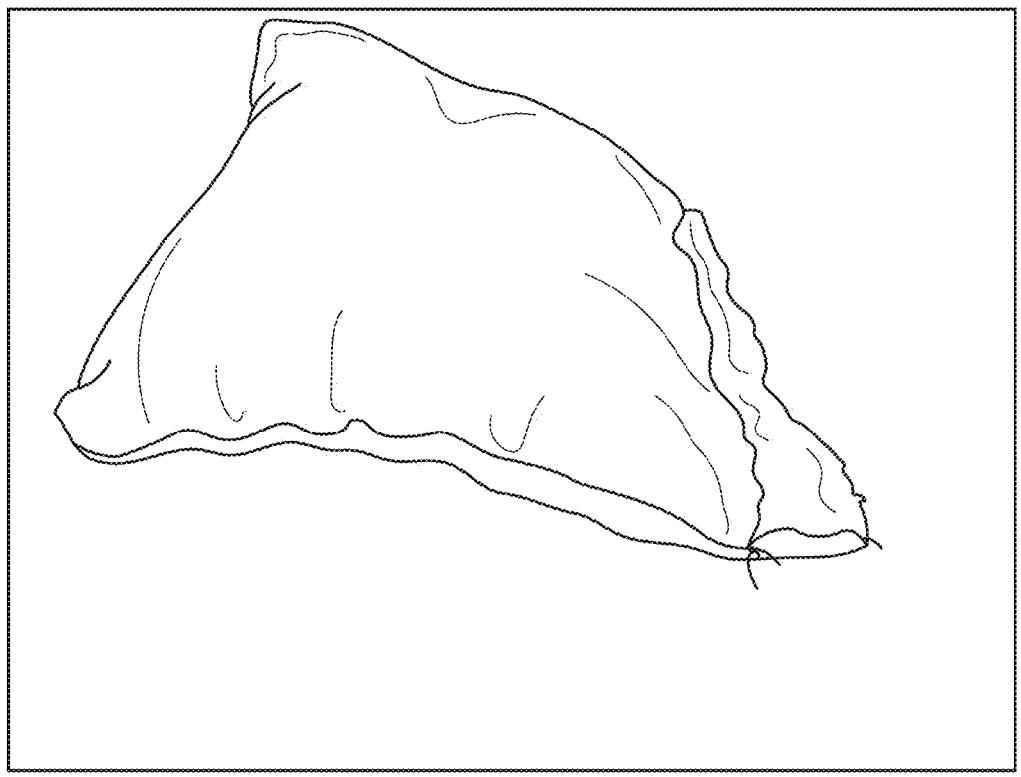
FIG. 1 shows a diagram of an example sodium capture device in accordance with some embodiments.

The invention is directed to compositions and methods of selectively removing ions from a composition using an ion-capturing device. For example, the ion-capturing device can be placed into the composition, and then stirred, shaken, or otherwise agitated for a period of time. Next, the ion-capturing device can be removed, thereby removing from the composition the ions captured thereby.

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate manner.

The singular forms "a", "an" and "the" include plural reference unless the context clearly dictates otherwise. The use of the word "a" or "an" when used in conjunction with the term "comprising" in the claims and/or the specification may mean "one," but it is also consistent with the meaning of "one or more," "at least one," and "one or more than one."

Wherever any of the phrases "for example," "such as," "including" and the like are used herein, the phrase "and without limitation" is understood to follow unless explicitly stated otherwise. Similarly, "an example," "exemplary" and the like are understood to be nonlimiting.

The term "substantially" allows for deviations from the descriptor that do not negatively impact the intended purpose. Descriptive terms are understood to be modified by the term "substantially" even if the word "substantially" is not explicitly recited.

The terms "comprising" and "including" and "having" and "involving" (and similarly "comprises", "includes," "has," and "involves") and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a process involving steps a, b, and c" means that the process includes at least steps a, b and c. Wherever the terms "a" or "an" are used, "one or more" is understood, unless such interpretation is nonsensical in context.

As used herein the term "about" can refer to approximately, roughly, around, or in the region of When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Ion Capturing Device

Aspects of the invention are directed towards an ion capturing device.

In embodiments, an ion capturing device can comprise a containment apparatus and a substance.

A containment apparatus can refer to a container or vessel that holds or includes within its volume or area or is capable of holding contents. The containment apparatus could be of any shape or size necessary for the desired use. For example, the containment apparatus can vary in size, depending on how much sodium needs to be removed and the volume of the composition from which the sodium needs to be removed. Non-limiting examples of the size of the containment apparatus comprises about 10 cm×10 cm×3 cm or anything smaller for personal use. In some embodiments, the containment apparatus can be about (a')×(b')×(c'), wherein (a') can be about 10 cm, about 9 cm, about 8 cm, about 7 cm, about 6 cm, about 5 cm, about 4 cm, about 3 cm, about 2 cm, about 1 cm, about 0.75 cm, about 0.5 cm, about 0.25 cm, or about 0.125 cm. In some embodiments, (b') can be about 10 cm, about 9 cm, about 8 cm, about 7 cm, about 6 cm, about 5 cm, about 4 cm, about 3 cm, about 2 cm, about 1 cm, about 0.75 cm, about 0.5 cm, about 0.25 cm, or about 0.125 cm. In some embodiments, (c') can be about 3 cm, about 2 cm, about 1 cm, about 0.75 cm, about 0.5 cm, about 0.25 cm, or about 0.125 cm. For example, to remove sodium from a personal serving of food, the containment apparatus can be a maximum of 10 cm×10 cm×3 cm, but can also be smaller in dimension. For multiple servings (or for a more of an industrial use), the containment apparatus can be, for example, larger. For multiple servings, or for industrial use, the containment apparatus can be about (a')×(b')×(c'), wherein (a') can be about 100 cm, about 90 cm, about 80 cm, about 70 cm, about 60 cm, about 50 cm, about 40 cm, about 30 cm, about 25 cm, about 20 cm, about 17.5 cm, about 15 cm, or about 12.5 cm. In some embodiments, (b') can be about 100 cm, about 90 cm, about 80 cm, about 70 cm, about 60 cm, about 50 cm, about 40 cm, about 30 cm, about 25 cm, about 20 cm, about 17.5 cm, about 15 cm, or about 12.5 cm. In some embodiments, (c') can be about 10 cm, about 9 cm, about 8 cm, about 7 cm, about 6 cm, about 5 cm, about 4 cm, about 3 cm, about 2 cm, about 1 cm, about 0.75 cm, about 0.5 cm, about 0.25 cm, or about 0.125 cm.

The apparatus can also be any shape. For example, embodiments can comprise shapes that maximize surface area to volume ratio, as they provide the ion-containing composition with more area with which to contact the ion-removing substance. Non-limiting examples of the shape comprises shapes that maximize surface area to volume ratio. Non-limiting examples of a containment apparatus comprises a bag, a cartridge, or a sponge.

In embodiments, the containment apparatus can comprise a material through which an ion can pass. Non-limiting examples of the material comprises a cellulose, cellulose esters, plastics, canvas, or other synthetic fibers.

For example, such materials can be referred to as porous, semi-porous, permeable, or semipermeable. Porous or semi-porous can refer to a material having one or more pores arranged therein, or the density or consistency of a solid material. For example, the pores are volumes within the porous material where there is no material. The pores can also be referred to as channels, thereby allowing fluids to flow through. For example, as used herein, "semi-porous" (or "semi-permeable") can refer a material that allows the passage of some, but not all, substances through it, highlighting the selectivity of the containment apparatus in allowing certain materials through it. In one embodiment, a cellulose bag would be permeable to water and ions, but not to zirconium phosphate. Without being bound by theory, from the perspective of water and ions, the cellulose is permeable (porous), but from the perspective of zirconium phosphate, it is not.

The porosity of the material can depend on the form (i.e., size) that the ion-capturing substance takes. The size of the pores must be small enough to keep the ion-capturing substance within the containment apparatus, yet large enough to allow efficient flow of the ion-containing composition, such as a food or beverage solution, into the containment apparatus to allow for ion exchange with the ion-capturing substance. The larger the pores, the more efficient the flow of the ion-containing composition inside of the containment apparatus and the more efficient the ion exchange with the ion-capture substance. Without wishing to be bound by theory, if the ion-capturing substance is present in a form small in size, such as a nanoparticle or a powder, the porosity must be drastically lower to ensure the ion-capturing substance remains inside of the containment apparatus. Non-limiting examples of the size of the substance in a smaller form comprises about 10 angstroms to about 10,000 Angstroms. In one embodiment, the size of the substance in a smaller form comprises about 500 to about 2,000 Angstroms. Without wishing to be bound by theory, if the ion-capturing substance is in a larger form, such as a bead, the porosity can be greater. Non-limiting examples of the substance in a larger form comprises about 0.1 mm to about 50 millimeters. In one embodiment, the size of the substance in a larger form comprises about 0.1 mm to about 10 millimeters.

For example, the pores of the containment apparatus are small enough such that the substance capable of ion-selective capture of ions remains inside of the containment apparatus and does not leech out. However, the pores are also large enough to allow for the easy passage of the ions in the ion-containing composition inside the containment apparatus.

In some embodiments, the pore sizes can be less than one nanometer. In other embodiments, the pore sizes can be about one nanometer. In other embodiments, the pore sizes can be greater than one nanometer. In other embodiments, the pore sizes can be about one micrometer. In other embodiments, the pore sizes can be about one millimeter. In some embodiments, the pore sizes can be about one centimeter. In other embodiments, the pore sizes can be greater than one centimeter.

"Permeable" can refer to a property of a material that readily allows gas or fluid to penetrate or pass through.

"Selectively permeable" can refer to a property of a material to allow certain substances to pass through the material while preventing other substances from being passed through.

"Semi-permeable" can refer to the property of a material wherein some, but not all, of the substance can permeate or pass through.

In embodiments, the permeability of the containment apparatus comprises about ten angstroms to about one centimeter.

In embodiments, the containment apparatus can comprise (or be manufactured from) a durable material that sufficiently contains the ion-capturing substance. For example, the containment apparatus can comprise (or be manufactured from) a material such as fabric, plastic, a membrane, a metal, or tubing (such as that made from cellulose).

An "ion capturing substance" also can be referred to as an "ion removing substance". In some embodiments, the ion capture substance can be a substance, or mixture of substances, that is capable of capturing or binding an ion (by physical, electromagnetic, chemical, electromagnetic, or other means, or a combination thereof), allowing the ion to be removed from a composition. This "ion removing substance" can consist of both substances that perform the actual capturing or binding (such as hydrogen zirconium phosphate) and substances that contribute to the form, size, and shape of the "ion capturing substance," as a whole (such as a silica bead, gels, etc.).

For example, the ion capturing substance comprises a compound of formula $M'M''_xA_2B_3O_{12}$ in NZP (sodium zirconium phosphate) form, wherein $M'$ is the ion to be captured by the substance such as a lithium ion, sodium ion, potassium ion, hydrogen ion, hydronium ion, rubidium ion, cesium ion, magnesium ion, calcium ion, strontium ion, barium ion, or mixtures thereof; $M''$ is a sodium ion, potassium ion, hydrogen ion, hydronium ion, or mixtures thereof; A is tin, germanium, titanium, zirconium, hafnium, aluminum, chromium, nobium, tantalum, scandium, or mixtures thereof; B is phosphorous, silicon, aluminum, sulfur, or mixtures thereof; "x" has a value of 0 to about 3. See, for example, Hawkins, H. T., et al. "Synthesis and characterization of uranium (IV)-bearing members of the [NZP] structural family." *Chemistry of materials* 11.10 (1999): 2851-2857 and Alamo, James, and Rustum Roy. "Crystal chemistry of the NaZr 2 (PO 4) 3, NZP or CTP, structure family." *Journal of materials science* 21.2 (1986): 444-450, each of which are incorporated by reference herein in their entireties.

Non-limiting examples of substances comprise hydrogen zirconium phosphate (HZP), $HZr_2(PO_4)_3$, another zirconium phosphate, or a similar substance comprising the formula $HA_2B_3O_{12}$, wherein A can be tin, germanium, titanium, zirconium, hafnium, aluminum, chromium, nobium, tantalum, scandium, or mixtures thereof; and B comprises phosphorous, silicon, aluminum, sulfur, or mixtures thereof.

In embodiments, the ion-capturing device can further comprise a composition which allows for the entrapment and immobilization of the substance, such as zirconium phosphate. For example, the substance can be mixed with such composition, thus entrapping and/or immobilizing the substance. The composition can have a high-surface area such that contact with the substance intended for ion removal is maximized. The composition can be a powder, a granule, a crystal, a suspension, an emulsion, a solution, polymeric beads (such as polyacrylamide beads), a gel (such as agarose, carrageenan, or alginate) or a resin. For example, the granule can be spherical, cylindrical, disk-shaped. For example, the composition, such as polymeric beads, can have pores allowing the entry of water but preventing the exit of the ion capturing substance, such as zirconium phosphate. The composition can be silica sol, silica beads, a porous polymer, polymeric beads, or a gel. Such compositions are known in the art. See, for example, Oi, Takao, et al. "Synthesis of Zirconium Phosphate, $HZr_2(PO_4)_3$, in Pores of Silica Beads and Some Ion Exchange Separation Properties of the Composite Obtained." *Separation Science and Technology* 44.15 (2009): 3679-3697, which is incorporated by reference herein in its entirety.

In embodiments, the substance can capture one or more ions. An "ion" can refer to any atom, molecule, or other object that has a net electrical charge formed, for example, by addition or removing electrons from the object. For example, the ion comprises a sodium ion, lithium ion, potassium ion, hydrogen ion, hydronium ion, rubidium ion, cesium ion, magnesium ion, calcium ion, strontium ion, or barium ion.

The term "ion exchange" can refer to the reversible exchange of ions between one composition, such as a solid, and another, such as a fluid.

The ion can be a monovalent ion or a polyvalent ion. For example, the polyvalent ion can be a divalent ion.

In embodiments, the substance can capture an ion through chemical means, physical means, or both. For example, a physical means can refer to physiosorption. For example, a chemical means can refer to chemisorption. In one embodiment, the physical means encompass ions experiencing an electronegative attraction towards the pores of the ion-capturing substance; once the substance has pulled the ions in, the small size of the pores act as a physical barrier, making it difficult for the ions to escape the electronegative pull of the pores.

In embodiments, the ion capturing device can further comprise a buffering agent or a buffering solution. In some embodiments, the buffering agent can be potassium citrate powder. For example, the buffering agent or buffering solution can be within the containment apparatus, such as in combination with the substance. For example, the buffering agent or buffering solution can control the pH of the ion-rich composition or solutions. For example, when hydrogen zirconium phosphate performs ion exchange on the solution, hydrogen ions are released into the solution. Thus, a food-safe buffer will be needed. As one example, the buffer can be potassium citrate; however, the skilled artisan will recognize that other buffers can be utilized. See, for example, Title 21, Chapter I, Subchapter B, part 184 of the Code of Federal Regulations.

In embodiments, the ion capturing device can be manufactured for use as described herein, such as in a food or beverage.

In embodiments, the ion capturing device can be manufactured for use as described herein, such as in the manufacture of a food or beverage.

In embodiments, the ion capturing device can be manufactured as a part of or can be removable affixed to a device adapted to be placed into a solution. Non-limiting examples of such devices adapted to be placed into a solution include a spoon, dipstick, stir-bar, or other stirring device.

In embodiments, the ion capturing device can be a portable ion capturing device. "Portable" can refer to an ion capturing device that can be easily carrier or carried by a human being. Portable devices can be comprised of a relatively few number of components that are themselves able to be carried and assembled by a human being.

Method of Use

Aspects of the invention are directed towards methods for using the ion capturing device described herein.

In an embodiment, the ion capturing device can be used for removing an ion, such as a sodium ion, from an ion-containing composition. For example, the method can comprise placing the ion capture device described herein into the ion-containing composition; agitating the ion capturing device for a period of time sufficient to remove one or more ions; and, removing the ion capturing device from the composition, thereby removing the one or more ions from the composition and thus providing a composition with reduced ion content.

In embodiments, the ion capturing device is removed from the composition upon the ion content reaching about 1% of the original ion content, about 10% of the original ion content, about 20% of the original ion content, about 30% of the original ion content, about 40% of the original ion content, about 50% of the original ion content, about 60% of the original ion content, about 70% of the original ion content, about 80% of the original ion content, about 90% of the original ion content, about 100% of the original ion content, or less than 100% of the original ion content. The skilled artisan will recognize, however, that the device can be removed from the composition upon the ion content reaching a range dependent upon the needs of the user.

For example, the ion content of the composition can be reduced by about 5%, by about 10%, by about 20%, by about 30%, by about 40%, by about 50%, by about 60%, by about 70%, by about 80%, by about 90%, by about 100%, or 100%.

In embodiments, the ion content of the composition with reduced ion content is about 1% of the original ion content, about 10% of the original ion content, about 20% of the original ion content, about 30% of the original ion content, about 40% of the original ion content, about 50% of the original ion content, about 60% of the original ion content, about 70% of the original ion content, about 80% of the original ion content, about 90% of the original ion content, about 100% of the original ion content, or less than 100% of the original ion content.

A "ion containing composition", such as that into which the ion capturing device can be placed, refers to a substance which comprises one or more ions. For example, the composition can be an edible composition, such as a food or beverage, a medical composition, or composition in need of ions to be removed therefrom.

For example, aspects of the invention can be used for water purification purposes. For example, the ion-rich composition can comprise water with problematic ions (such as hard ions like calcium, or heavy metal ions that could be potentially toxic). If the ion-capturing substance were a traditional mixed bed ion exchange resin, the substance can then purify the water when access to an ion exchange column or more sophisticated ion-removal methods are not available. For example, if the device described herein contains a mixed bed resin, it can be mixed with seawater and make the water potable (such as in an emergency situation). Non-limiting examples of the use of the invention for water purification comprises a mixed bed ion-exchange resin.

In embodiments, the ion capturing device is agitated within the ion-containing composition for a period of time sufficient to remove one or more ions. It will be understood that the rate of removal and total agitation time depends on the availability of the ion-capture substance for exchange (which can be dictated by the porosity/permeability of the containment apparatus), the starting ion concentration in the ion-containing composition, and the concentration of the ion-capture substance. In embodiments, the period of time can be about 1 second, about 5 seconds, about 30 seconds, about 1 minute, about 5 minutes, about 10 minutes, about 30 minutes, about 1 hour, about 2 hours, about 6 hours, about 12 hours, about 24 hours, or longer than 24 hours.

In embodiments, "agitating" can refer to the process of putting a mixture into motion with a turbulent force. Suitable methods of agitating include, but are not limited to, stirring, mixing, shaking, or spinning. For example, agitating can be applying at least one, or two or more of any combination of the basic dynamic motion, including translation (e.g., side-to-side vibration), rotation (e.g., the rotation of the reaction mixture or rotation) and inversion (e.g., inverted with respect to the terminal end)

In embodiments, the method can further comprise the step of discarding, reusing, or recharging the device.

"Discarding" can refer to the act of casting aside, disposing of, or otherwise not using in a subsequent process, step, or article of manufacture.

"Reusing" can refer to the action or practice of using an item, whether for its original purpose or to fulfill a different function.

"Recharging" can refer to the process of treating the item or composition to restore the functional capacity of a material, such as an ion-capturing material, to return the material to conditions for reuse or use in a new setting. For example, the device can be recharged by agitating the device in a recharging solution that allows one or more ions to release from the substance of the device. For example, the recharging solution can be an acidic solution, non-limiting examples of which include hydrochloric acid, nitric acid or a mixture of hydrochloric acid and either ammonium chloride or ammonium nitrate. The concentration of each compound could be between 1-3 M (as mentioned in the Nakajima paper). For example, the pH of the acidic recharging solution is about pH 7, about pH 6, about pH 5, about pH4, about pH 3, about pH 2, about pH 1, or below pH 1. Referring to Nakajima, Yasushi, and Isao Yoshida. "Sodium selective ion-exchange properties of zirconium phosphate, HZr2 (PO4) 3, and its application for the removal of sodium ions." *Analytical sciences* 12.6 (1996): 935-940, for example, any recharging solution under pH 1 can effectively recharge the ion-capturing substance. See, specifically, Table 2 on page 939 of the paper, which is incorporated by reference herein in its entirety.

Kits

Aspects of the invention are also directed towards kits for removing one or more ions from an ion-containing composition. The term "kit" can refer to a set of articles that facilitates the process, method, assay, analysis or manipulation of a sample. The kit can include instructions for using the kit (eg, instructions for the method of the present invention), materials, solutions, components, reagents, chemicals, or enzymes required for the method, and other optional components. In some embodiments, the present invention provides kits for removing one or more ions from an ion-containing composition, thus reducing the ion content of the ion-containing composition. These kits include, for example, a containment apparatus and an ion-capturing substance. Optionally, the kits can include other components and solutions, such as a recharging solution or a buffer. Additionally, the kit can include materials that would allow the user to assess the ion-concentration of the ion-containing composition once ion-capturing has taken place. In some embodiments, the kits comprise a device for assisting in the agitation. Non-limiting examples of a device for assisting in agitation include a spoon, a stir, or stirring apparatus. In some embodiments, the kits comprise of a flavor additive. Non-limiting examples of a flavor additive include potassium salts.

EXAMPLES

Examples are provided below to facilitate a more complete understanding of the invention. The following examples illustrate the exemplary modes of making and practicing the invention. However, the scope of the invention is not limited to specific embodiments disclosed in these Examples, which are for purposes of illustration only, since alternative methods can be utilized to obtain similar results.

Example 1

Example 1 There is a need for a portable, easy-to-use sodium removal device catered towards capturing sodium for the removal of sodium from food, beverages, or other consumables.

FIG. 1 is a picture of an example sodium capture device. The sodium capture device includes a semi-porous bag (for example a cellulose bag) that is filled with a substance capable of sodium-selective capture of ions.

The porous, semi-porous, permeable, or semi-permeable containment apparatus can be made of fabric, plastic, membrane, or any material that allows for the passage of sodium-containing food or beverage. The pores of the apparatus are small enough such that the substance capable of sodium-selective capture of ions remains inside of the containment apparatus and does not leech out. The pores are also large enough to allow for the easy passage of the sodium-containing food or beverage inside the containment apparatus.

The substance responsible for the sodium-selective capture of ions can be any substance that at least somewhat specifically captures sodium ions for removal. For example, and without wishing to be bound by theory, the ion-capture does not have to only remove sodium ions, but it should have at least some specificity for sodium ions over other ions. The substance can do so through ion-exchange, trapping ions within a crystal structure of the substance, adsorption, chelation, or through any other similar chemical or physical means. One example of such a substance is hydrogen zirconium phosphate, $HZr_2(PO_4)_3$ as described by Y. Nakajima and I. Yoshida in their paper, "Sodium Selective Ion-Exchange Properties of Zirconium Phosphate, $HZR_2(PO_4)_3$, and Its Application for the Removal of Sodium Ions" (Analytical Sciences 12 (6), 935-940, 1996). This hydrogen zirconium phosphate can either be placed inside of a containment apparatus in powdered form or in spherical or other shaped granules made by mixture with silica sol or a similar substance.

Figure 2:
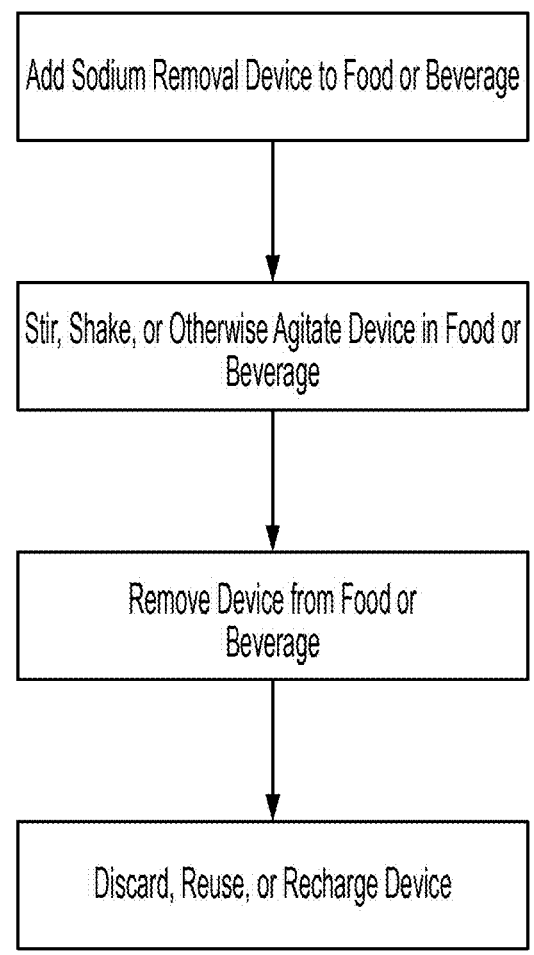
FIG. 2 shows a flowchart of an example method of removing sodium in accordance with some embodiments.
Figure 3:
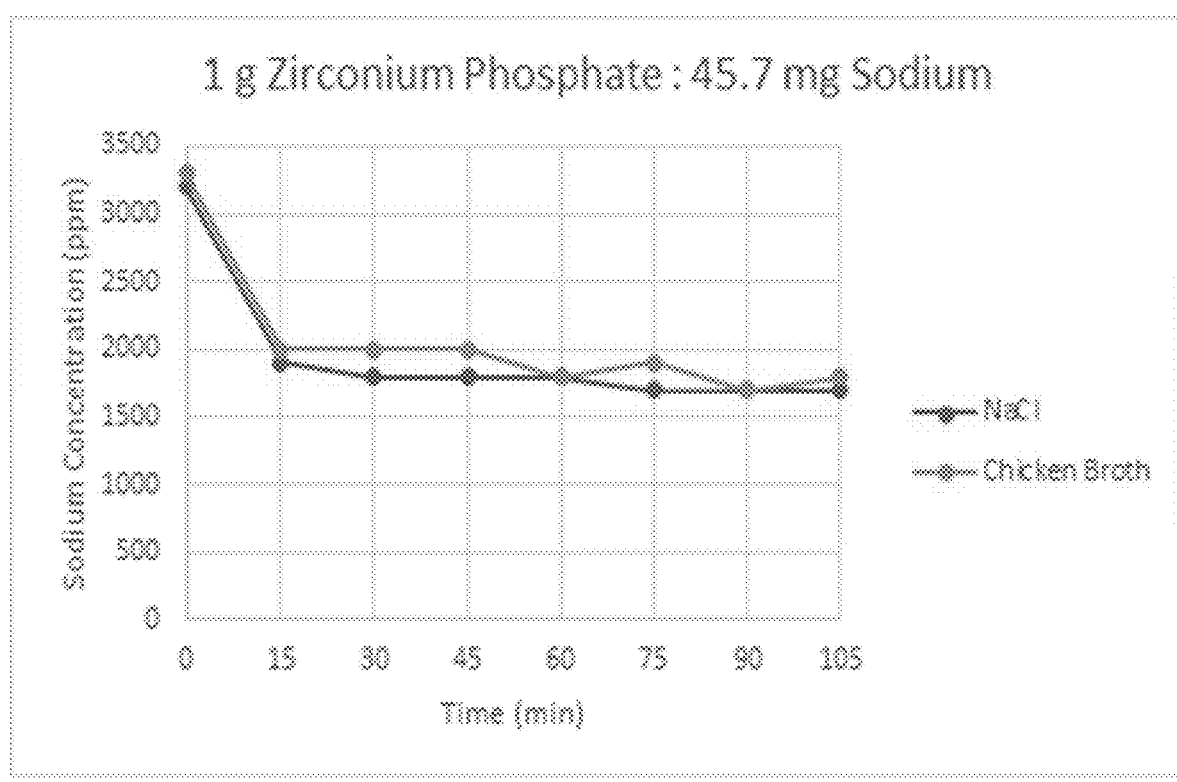
FIG. 3 shows a graph of sodium concentration over time for 1 g Zirconium Phosphate: 45.7 mg sodium test.
Figure 4:
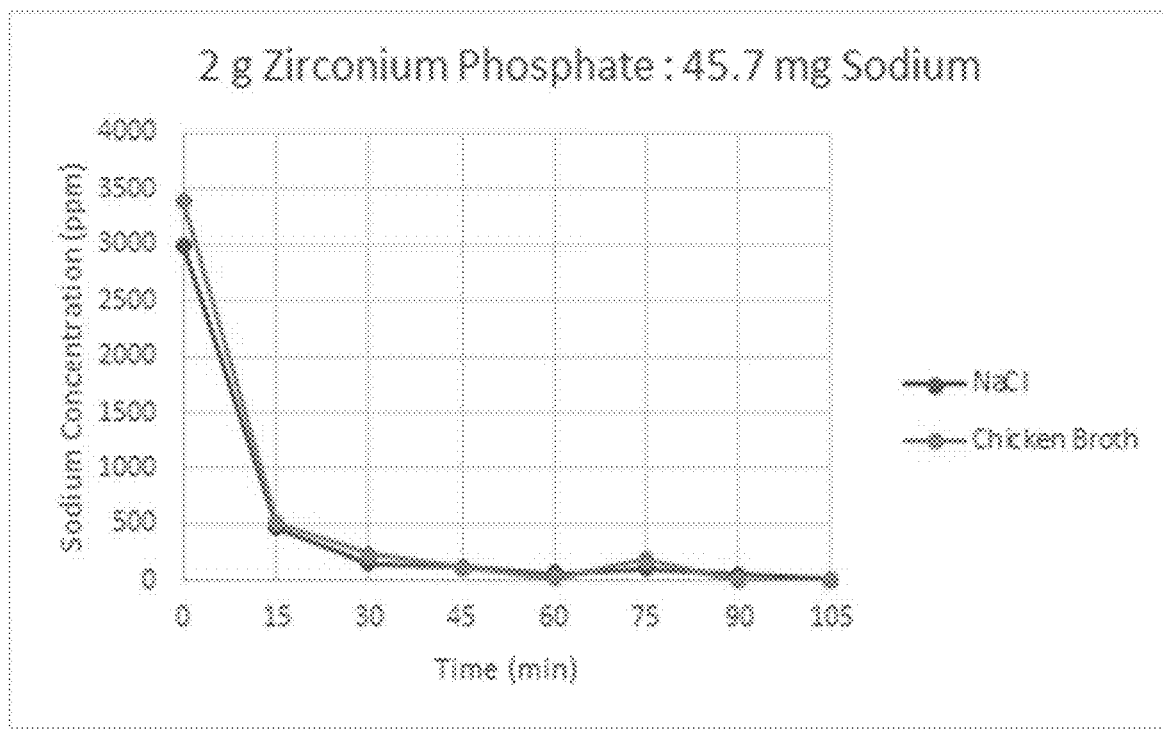
FIG. 4 shows a graph of sodium concentration over time for 2 g Zirconium Phosphate: 45.7 mg sodium test.
Figure 5:
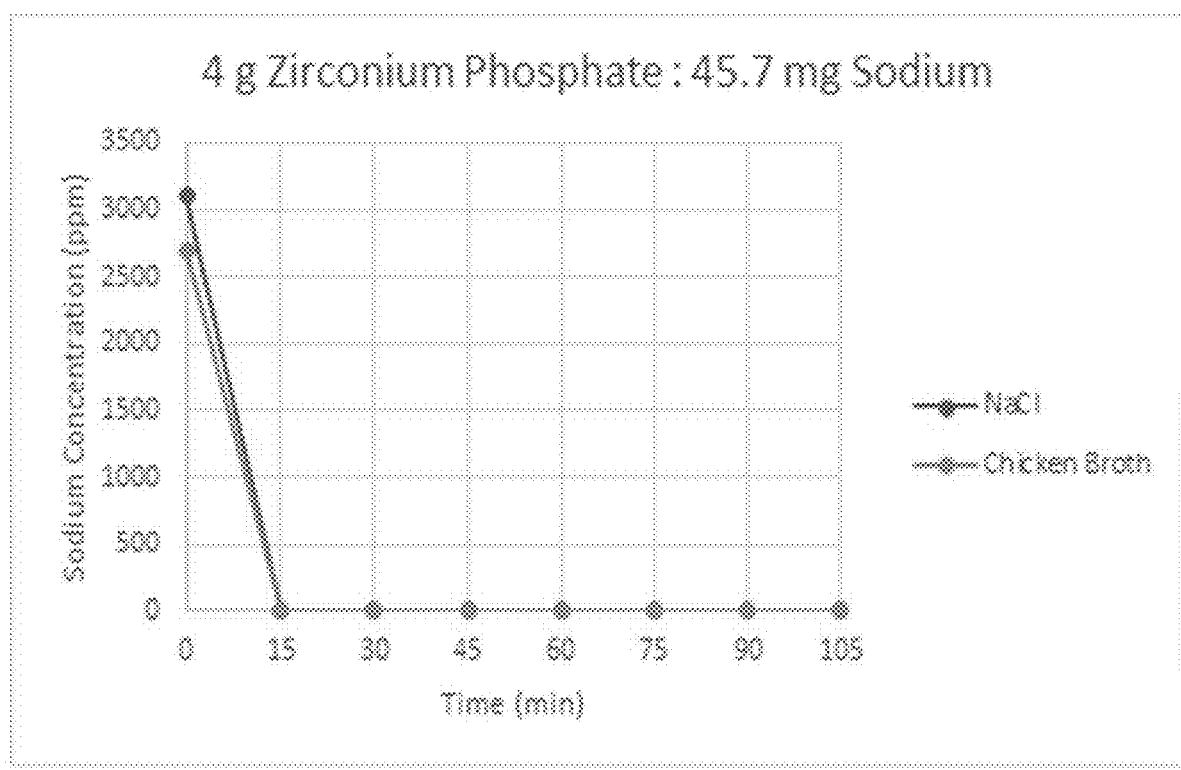
FIG. 5. shows a graph of sodium concentration over time for 4 g Zirconium Phosphate: 45.7 mg sodium test.

FIG. 2 is a flowchart of an example method of removing sodium in accordance with some embodiments. The method begins with the addition of the sodium removal device to a food or beverage.

After the addition of the sodium removal device, it is then stirred, shaken or otherwise agitated within the food or beverage.

The device is then removed, taking with it many sodium ions which were initially present within the food or beverage.

The device can then be either discarded, reused (if any sodium removal capacity remains), or recharged.

Recharging the device consists of stirring, shaking, or otherwise agitating the device in the acidic solution in order to allow the sodium ions to release from the substance responsible for the sodium-selective removal of ions.

It is, therefore, apparent that there is provided, in accordance with the various embodiments disclosed herein, a sodium removal device and method for removing said sodium from food and beverages.

While the disclosed subject matter has been described in conjunction with a number of embodiments, it is evident that many alternatives, modifications and variations would be, or are, apparent to those of ordinary skill in the applicable arts. Accordingly, Applicant intends to embrace all such alternatives, modifications, equivalents and variations that are within the spirit and scope of the disclosed subject matter.

Example 2

Synthesis of Zirconium Phosphate

Add 40 g zirconyl chloride octahydrate, 31.30 g oxalic acid, and 19.361 g monosodium phosphate to 500 mL distilled water in a large round-bottom flask. Stir and continue adding distilled water until all three powders have dissolved. Add ammonium hydroxide in small portions until the solution has a pH of 3. Reflux with an air condenser for six days; the solution will be milky white in color. Filter the precipitate using a fritted funnel*. Stir filtered precipitate with 210 mL distilled water and 90 mL 36.5% hydrochloric acid solution for 24 hours. Filter the precipitate using a fritted funnel. Wash the solution with distilled water, ensuring that no acid remains. Remove as much liquid as possible from the precipitate using a fritted funnel. Heat precipitate at 680 degrees Celsius for one hour in an oven to heat treat. Allow to cool and weigh precipitate. Total weight of precipitate obtained was 19.874 g.

Filtering the precipitate in a fritted funnel was extremely difficult due to its small particle size. Centrifugation will likely be much easier and will be pursued when this synthesis is repeated.

Testing:

The goal of this testing was to test the sodium selectivity of the synthesized zirconium phosphate as well as to test the effect the concentration of zirconium phosphate used affected the sodium removal time.

Prepare three test solutions of zirconium phosphate.
1. 1.011 g zirconium phosphate and 6.4 mL distilled water
   a. This allows for a 1 g zirconium phosphate:45.7 mg sodium ratio.
2. 2.022 g zirconium phosphate and 6.4 mL distilled water
   a. This allows for a 2 g zirconium phosphate:45.7 mg sodium ratio.
3. 4.044 g zirconium phosphate and 6.4 niL distilled water
   a. This allows for a 4 g zirconium phosphate:45.7 mg sodium ratio.

(45.7 mg is significant because the paper that describes the sodium selective nature of zirconium phosphate states that 1 gram of zirconium phosphate can adsorb 45.7 mg of sodium. Varying the ratio of zirconium phosphate to sodium allows us to see the impact a higher concentration of zirconium phosphate has on the rate of sodium removal.)

Prepare a sodium chloride solution with a sodium concentration of 7400 ppm. Boil down Swanson's chicken broth until its sodium concentration reaches 7400 ppm (The normal sodium concentration of Swanson's chicken broth is 3700 ppm. Doubling the sodium concentration to 7400 ppm allows the water in the zirconium phosphate solution to dilute the entire test solution to 3700 ppm when they are mixed).

Obtain and label 90 1.5-mL microcentrifuge tubes by number:
Tubes 1-15, 46-60: Add 218 microliters of zirconium phosphate solution 1
Tubes 16-30, 61-75: Add 209 microliters of zirconium phosphate solution 2
Tubes 31-45, 76-90: Add 204.5 microliters of zirconium phosphate solution 3
Batch 1: Add 200 microliters of sodium chloride solution to tubes 1, 16, and 31, and 200 microliters of concentrated chicken broth solution to tubes 46, 61, and 76. Cap tubes and place in agitating incubator set at 80 degrees Celsius.
Batch 2: Add 200 microliters of sodium chloride solution to tubes 2, 17, and 32, and 200 microliters of concentrated chicken broth solution to tubes 47, 62, and 77. Cap tubes and place in agitating incubator set at 80 degrees Celsius.
Batch 3: Add 200 microliters of sodium chloride solution to tubes 3, 18, and 33, and 200 microliters of concentrated chicken broth solution to tubes 48, 63, and 78. Cap tubes and place in agitating incubator set at 80 degrees Celsius.
Batch 4: Add 200 microliters of sodium chloride solution to tubes 4, 19, and 34, and 200 microliters of concentrated chicken broth solution to tubes 49, 64, and 79. Cap tubes and place in agitating incubator set at 80 degrees Celsius.
Batch 5: Add 200 microliters of sodium chloride solution to tubes 5, 20, and 35, and 200 microliters of concentrated chicken broth solution to tubes 50, 65, and 80. Cap tubes and place in agitating incubator set at 80 degrees Celsius.
Batch 6: Add 200 microliters of sodium chloride solution to tubes 6, 21, and 36, and 200 microliters of concentrated chicken broth solution to tubes 51, 66, and 81. Cap tubes and place in agitating incubator set at 80 degrees Celsius.
Batch 7: Add 200 microliters of sodium chloride solution to tubes 7, 22, and 37, and 200 microliters of concentrated chicken broth solution to tubes 52, 67, and 82. Cap tubes and place in agitating incubator set at 80 degrees Celsius.
Batch 8: Add 200 microliters of sodium chloride solution to tubes 8, 23, and 38, and 200 microliters of concentrated chicken broth solution to tubes 53, 68, and 83. Cap tubes and place in agitating incubator set at 80 degrees Celsius.
Batch 9: Add 200 microliters of sodium chloride solution to tubes 9, 24, and 39, and 200 microliters of concentrated chicken broth solution to tubes 54, 69, and 84. Cap tubes and place in agitating incubator set at 80 degrees Celsius.
Batch 10: Add 200 microliters of sodium chloride solution to tubes 10, 25, and 40, and 200 microliters of concentrated chicken broth solution to tubes 55, 70, and 85. Cap tubes and place in agitating incubator set at 80 degrees Celsius.

Batch 11: Add 200 microliters of sodium chloride solution to tubes 11, 26, and 41, and 200 microliters of concentrated chicken broth solution to tubes 56, 71, and 86. Cap tubes and place in agitating incubator set at 80 degrees Celsius.

Batch 12: Add 200 microliters of sodium chloride solution to tubes 12, 27, and 42, and 200 microliters of concentrated chicken broth solution to tubes 57, 72, and 87. Cap tubes and place in agitating incubator set at 80 degrees Celsius.

Batch 13: Add 200 microliters of sodium chloride solution to tubes 13, 28, and 43, and 200 microliters of concentrated chicken broth solution to tubes 58, 73, and 88. Cap tubes and place in agitating incubator set at 80 degrees Celsius.

Batch 14: Add 200 microliters of sodium chloride solution to tubes 14, 29, and 44, and 200 microliters of concentrated chicken broth solution to tubes 59, 74, and 89. Cap tubes and place in agitating incubator set at 80 degrees Celsius.

Batch 15: Add 200 microliters of sodium chloride solution to tubes 15, 30, and 45, and 200 microliters of concentrated chicken broth solution to tubes 60, 75, and 90. Cap tubes and place in agitating incubator set at 80 degrees Celsius.

Remove tubes from incubator after they have been in the incubator for the following lengths of time:
Batch 1: 15 minutes
Batch 2: 30 minutes
Batch 3: 45 minutes
Batch 4: 60 minutes
Batch 5: 75 minutes
Batch 6: 90 minutes
Batch 7: 105 minutes
Batch 8: 120 minutes
Batch 9: 135 minutes
Batch 10: 150 minutes
Batch 11: 165 minutes
Batch 12: 180 minutes
Batch 13: 195 minutes
Batch 14: 210 minutes
Batch 15: 225 minutes Once each batch has been removed from the incubator, centrifuge each tube in a microcentrifuge at top speed for 20 seconds. Remove from microcentrifuge and pipette off the liquid from each tube and place into new microcentrifuge tube. Test sodium concentration with LAQUA Sodium Ion Meter. (Note: Water began evaporating from tubes after they had been in the incubator for a while. As such, there was not enough liquid in the tubes after 105 minutes for the sodium meter to register a concentration when tested.)

The results of these tests can be seen in FIGS. 3-6. In FIGS. 3-6, the sodium content over time looks almost identical for both the NaCl solution and the Chicken Broth. This suggests that the compound synthesized was indeed sodium selective, as chicken broth contains many non-sodium ions that may have been competing with sodium ions for zirconium phosphate adsorption. The data from FIG. 3 was not very useful, since all the sodium was removed in the first 15 minutes. As such, a similar test was run, this time only using 4 g Zirconium Phosphate:45.7 mg Sodium and only Chicken Broth.

Example 3

Test 2

Prepare a test solution with 0.5184 g zirconium phosphate and 3.2 mL distilled water. Number microcentrifuge tubes 1-15. Add 218 microliters of test solution to each tube. Add 200 microliters of concentrated chicken broth to each tube. Add to agitating incubator set at 80 degrees Celsius.

Remove tubes after the following amounts of time:
Tube 1: 1 minute
Tube 2: 2 minutes
Tube 3: 3 minutes
Tube 4: 4 minutes
Tube 5: 5 minutes
Tube 6: 6 minutes
Tube 7: 7 minutes
Tube 8: 8 minutes
Tube 9: 9 minutes
Tube 10: 10 minutes
Tube 11: 11 minutes
Tube 12: 12 minutes
Tube 13: 13 minutes
Tube 14: 14 minutes
Tube 15: 15 minutes Once each tube has been removed from the incubator, centrifuge each tube at top speed for 20 seconds. Remove from microcentrifuge and pipette off the liquid from each tube and place into new microcentrifuge tube. Test sodium concentration with LAQUA Sodium Ion Meter.

Figure 6:
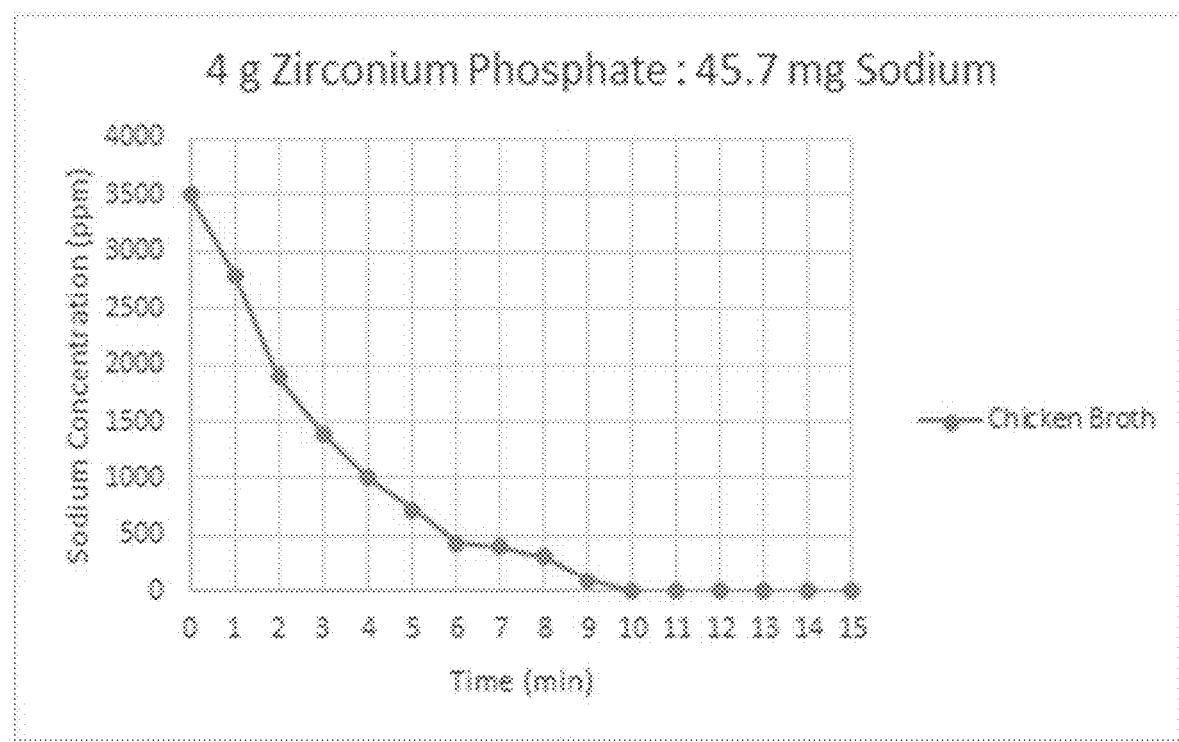
FIG. 6. shows a graph of sodium concentration over time for 4 g Zirconium Phosphate: 45.7 mg sodium broth test.
Figure 7:
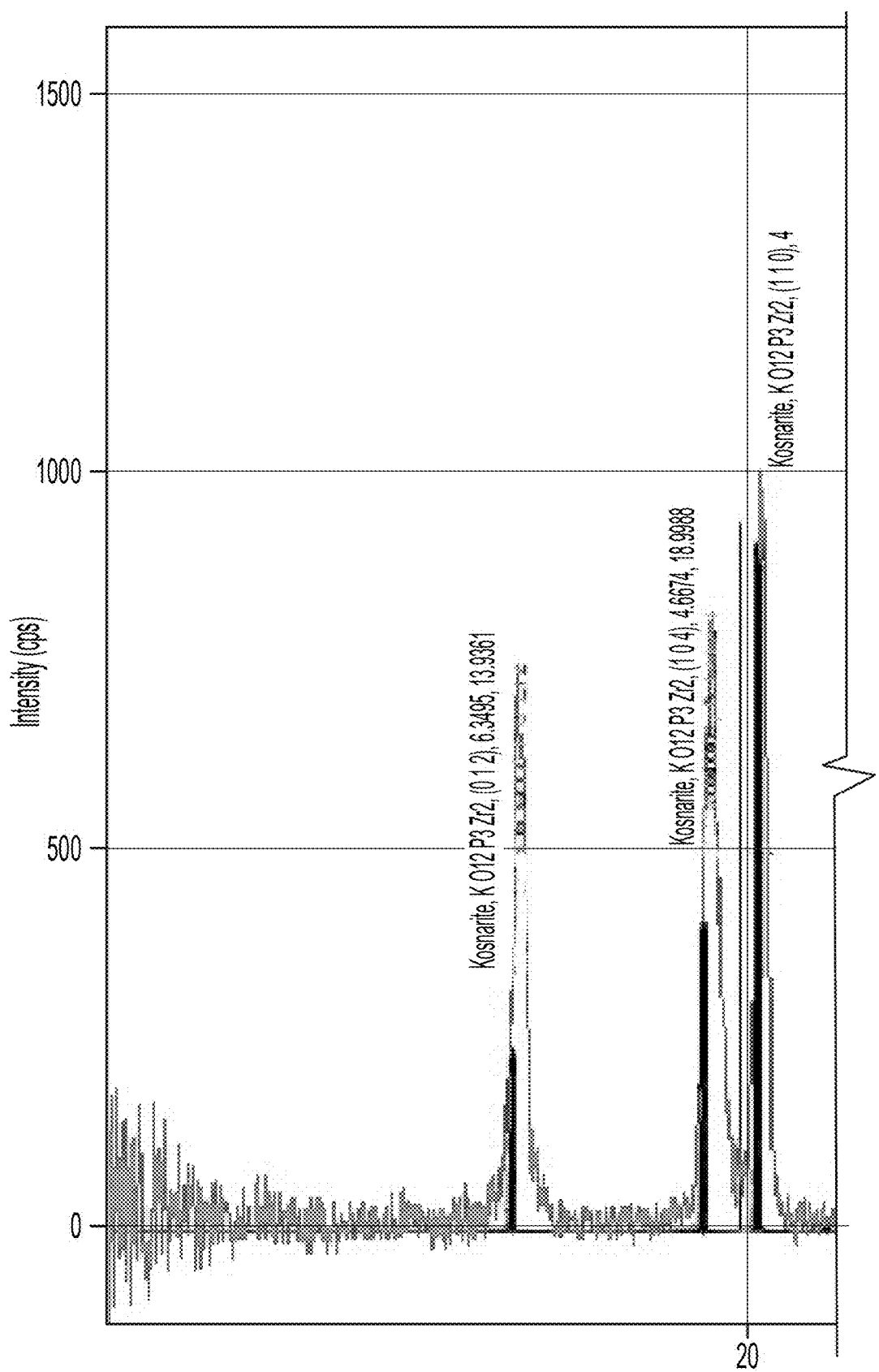
FIG. 7. shows an XRD spectrum.
Figure 7:
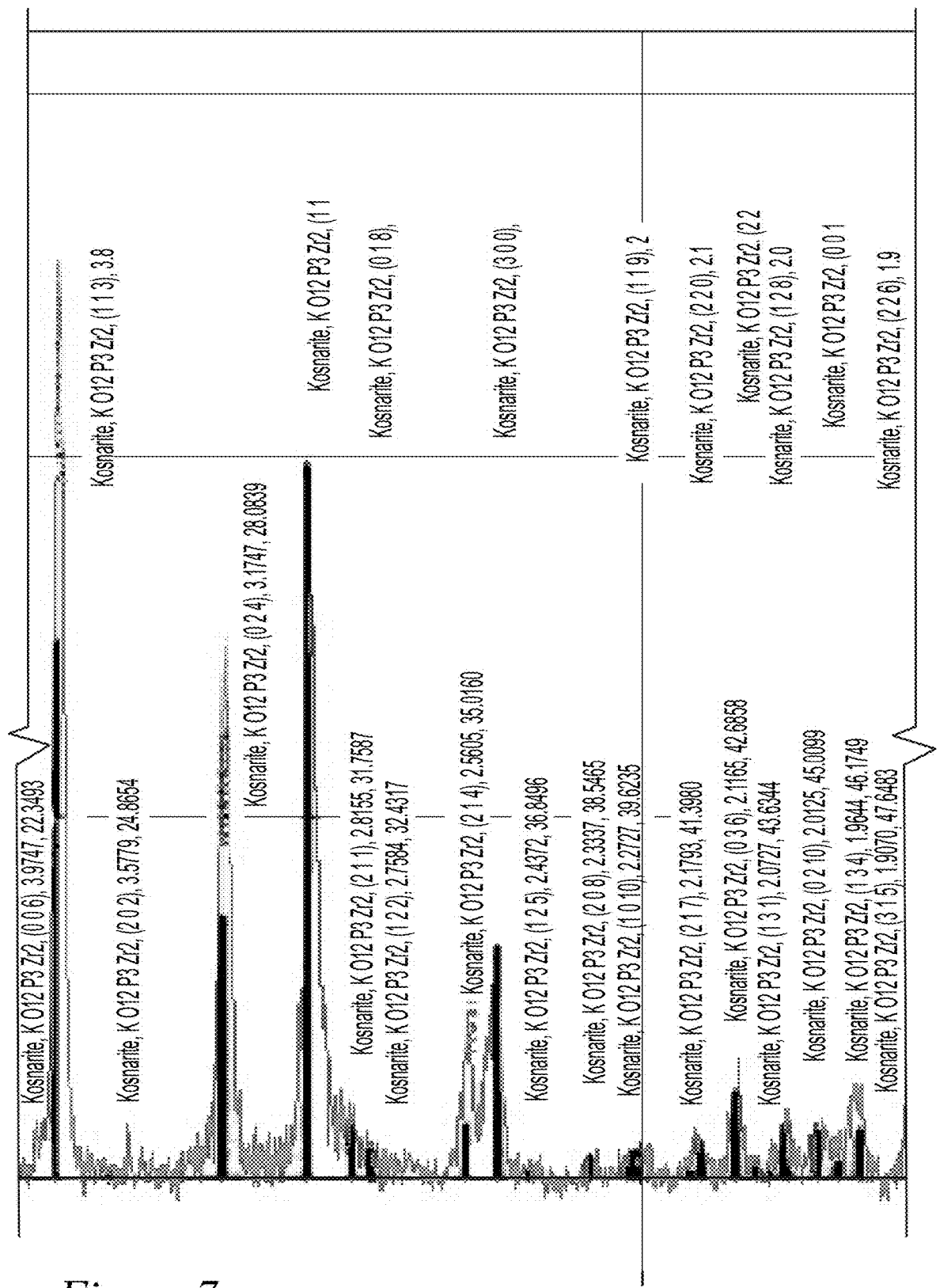
Figure 7:
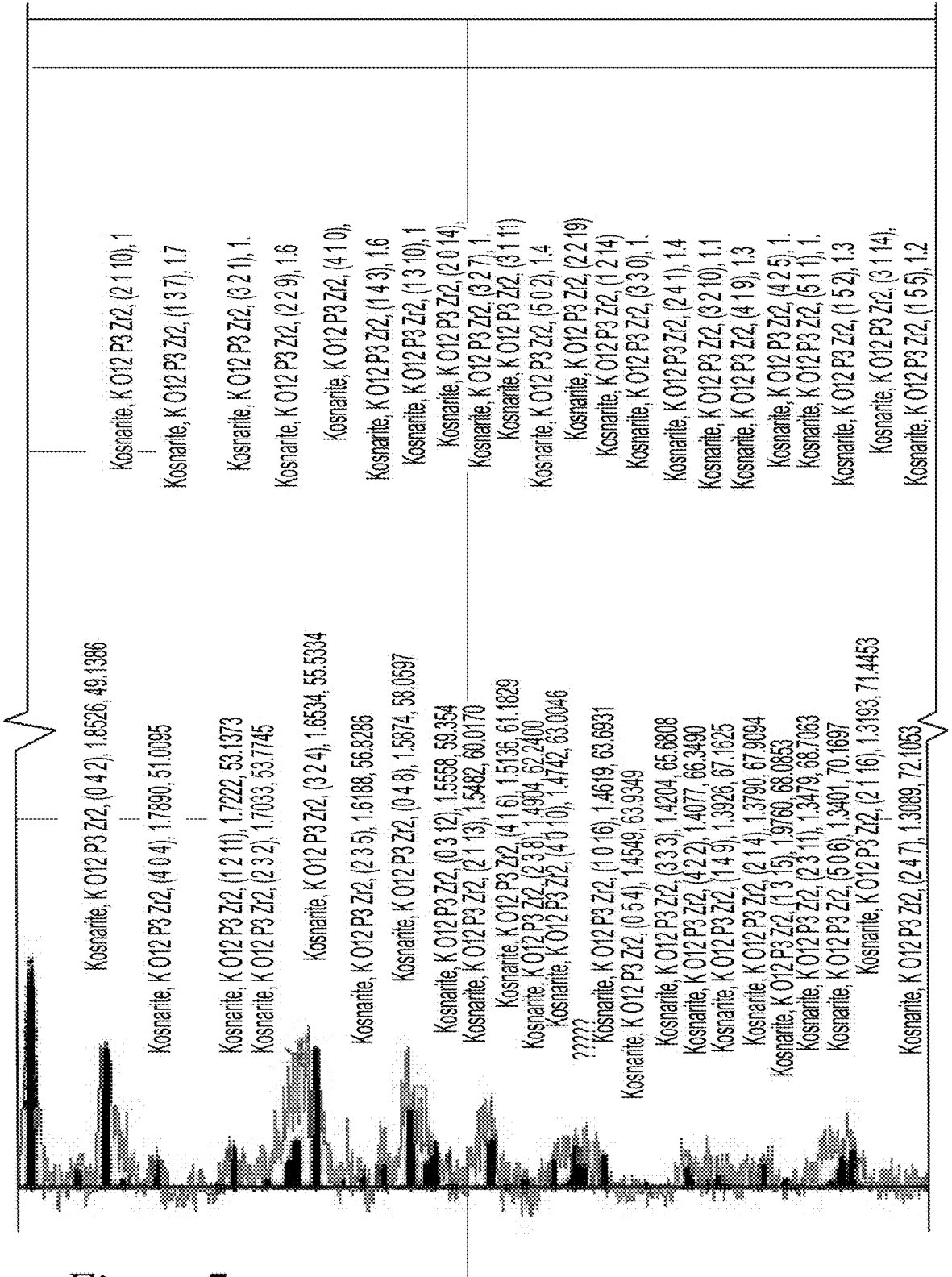
Figure 7:
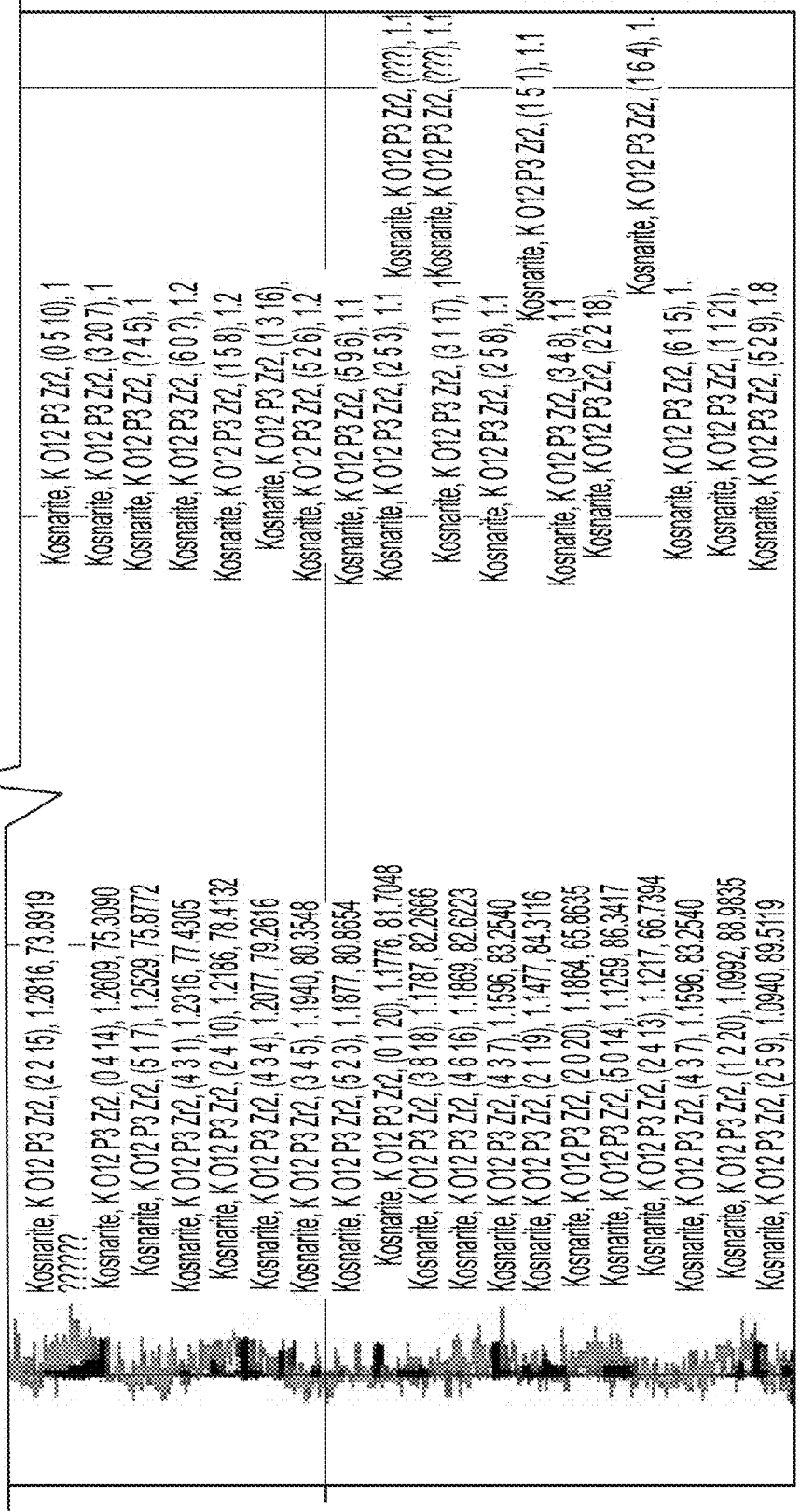
Figure 8:
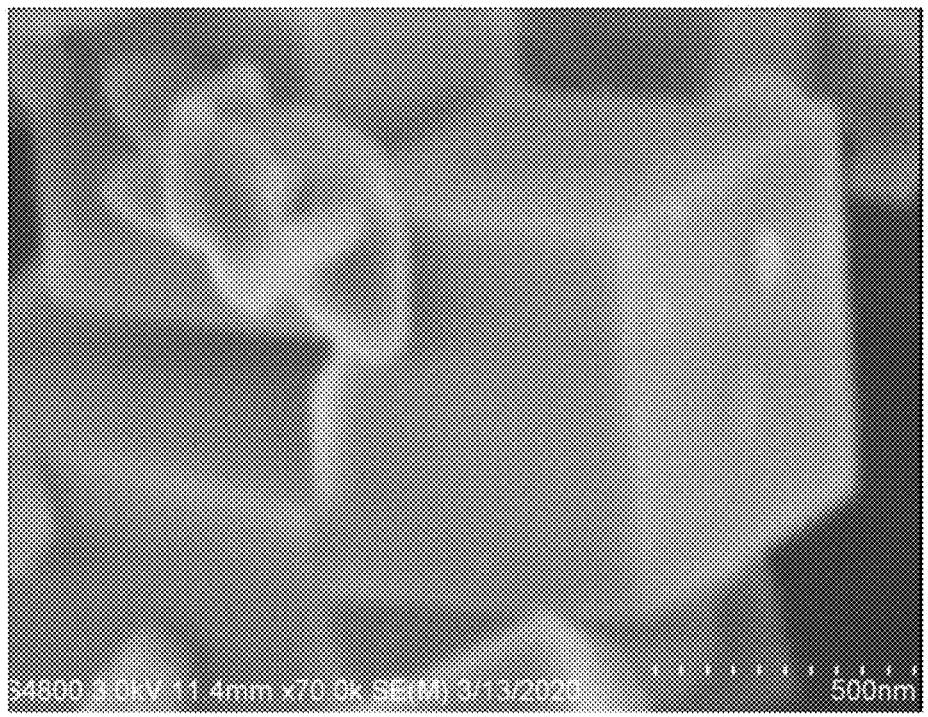
FIG. 8 is an electron micrograph of an SEM image of the hydrogen zirconium phosphate synthesized; the scale bar is 500 nm.
Figure 9:
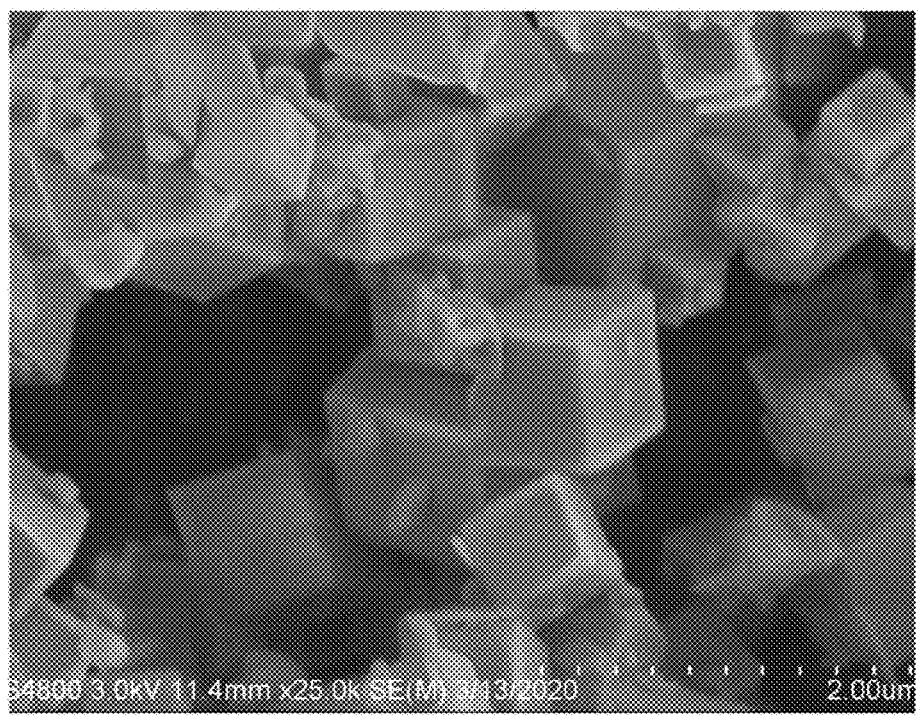
FIG. 9 is an electron micrograph of an SEM image of the hydrogen zirconium phosphate synthesized; the scale bar is 2 μm.
Figure 10:
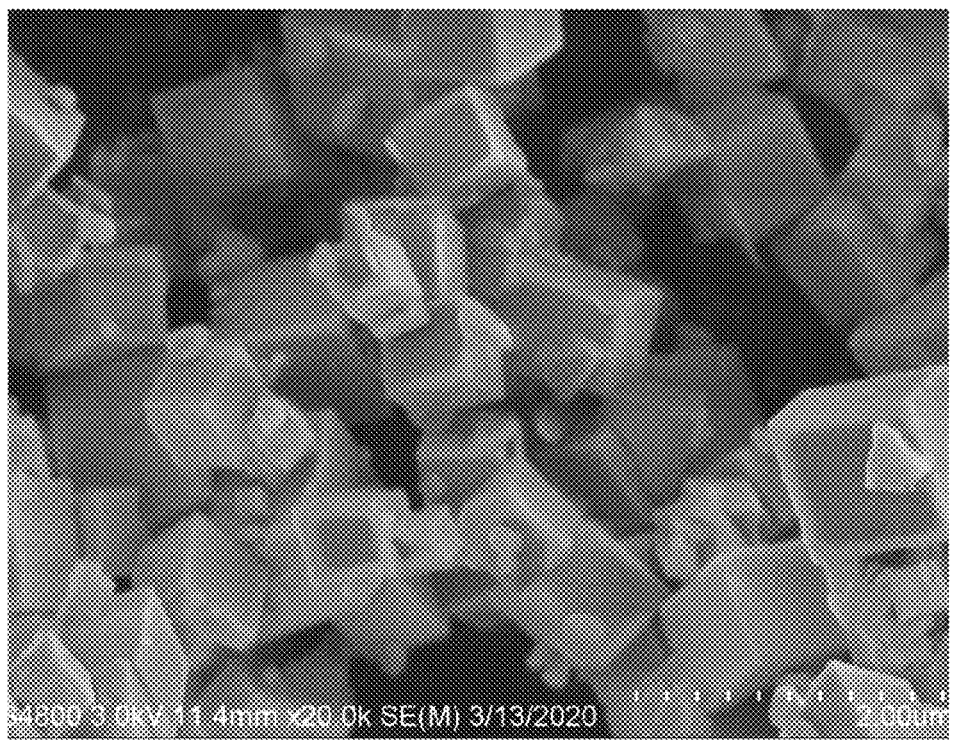
FIG. 10 is an electron micrograph of an SEM image of the hydrogen zirconium phosphate synthesized; the scale bar is 2 μm.
Figure 11:
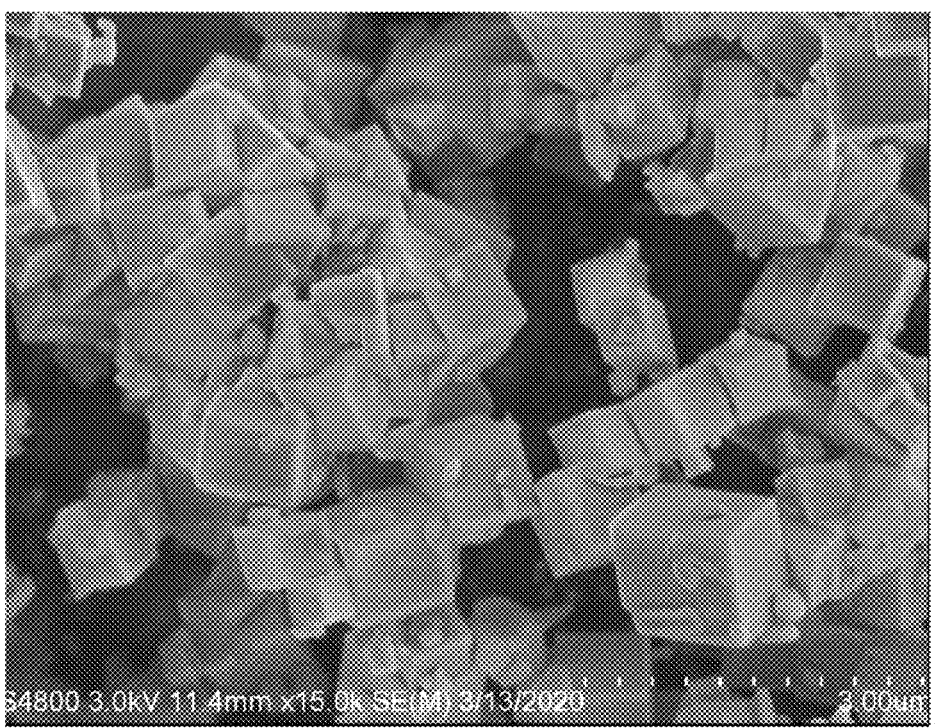
FIG. 11 is an electron micrograph of an SEM image of the hydrogen zirconium phosphate synthesized; the scale bar is 3 μm.
Figure 12:
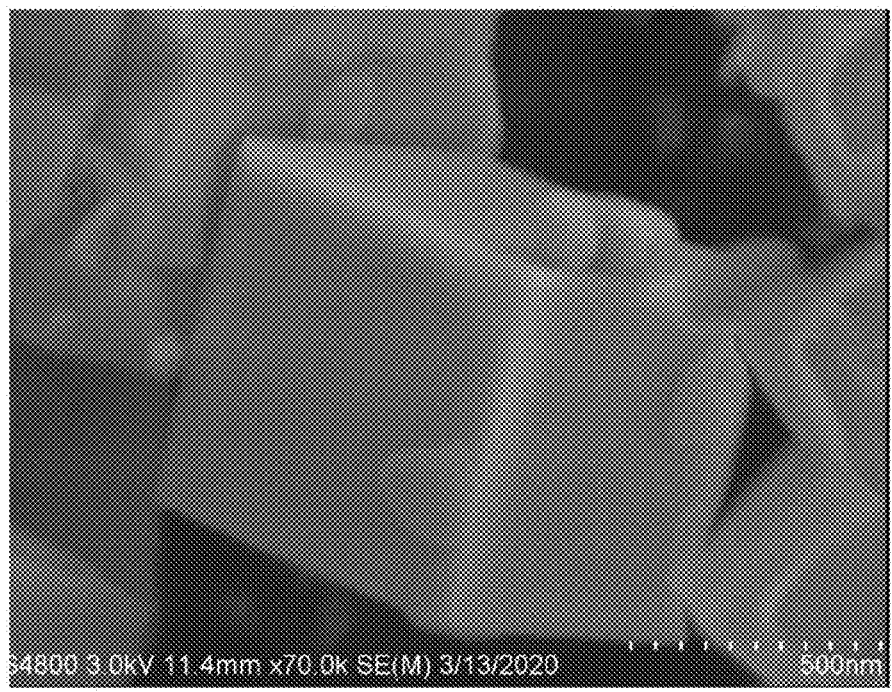
FIG. 12 is an electron micrograph of an SEM image of the hydrogen zirconium phosphate synthesized; the scale bar is 500 nm.
Figure 13:
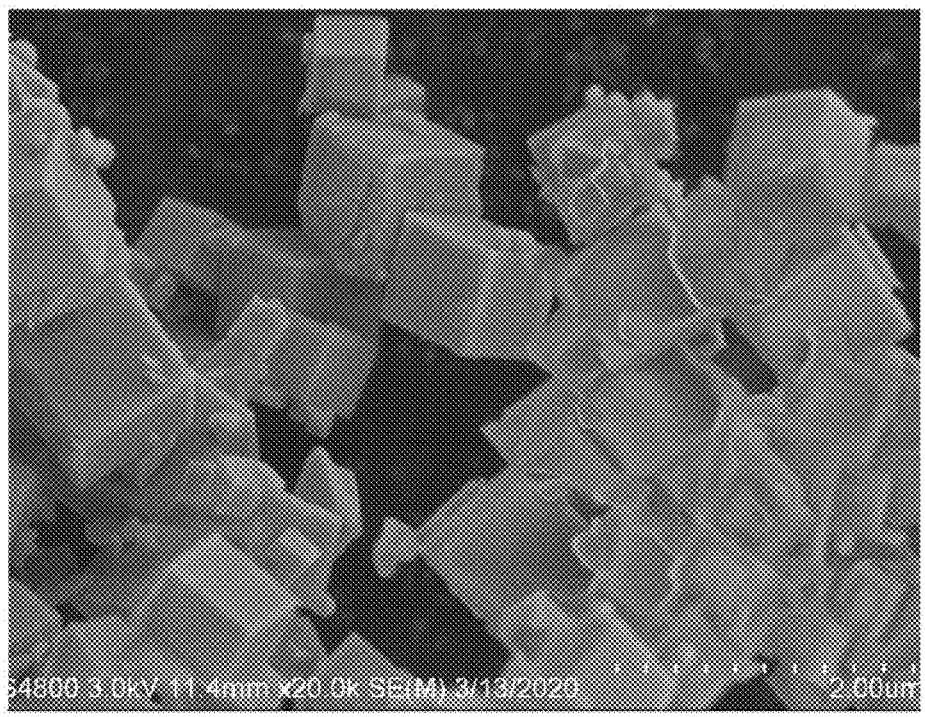
FIG. 13 is an electron micrograph of an SEM image of the hydrogen zirconium phosphate synthesized; the scale bar is 2 μm.
Figure 14:
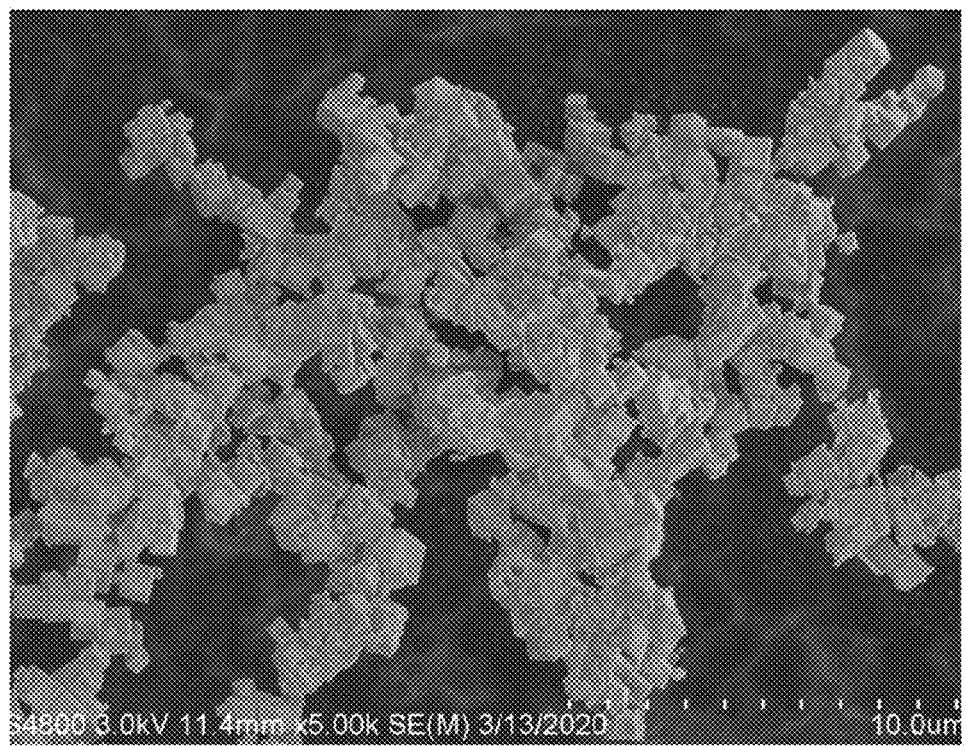
FIG. 14 is an electron micrograph of an SEM image of the hydrogen zirconium phosphate synthesized; the scale bar is 3 μm.
Figure 15:
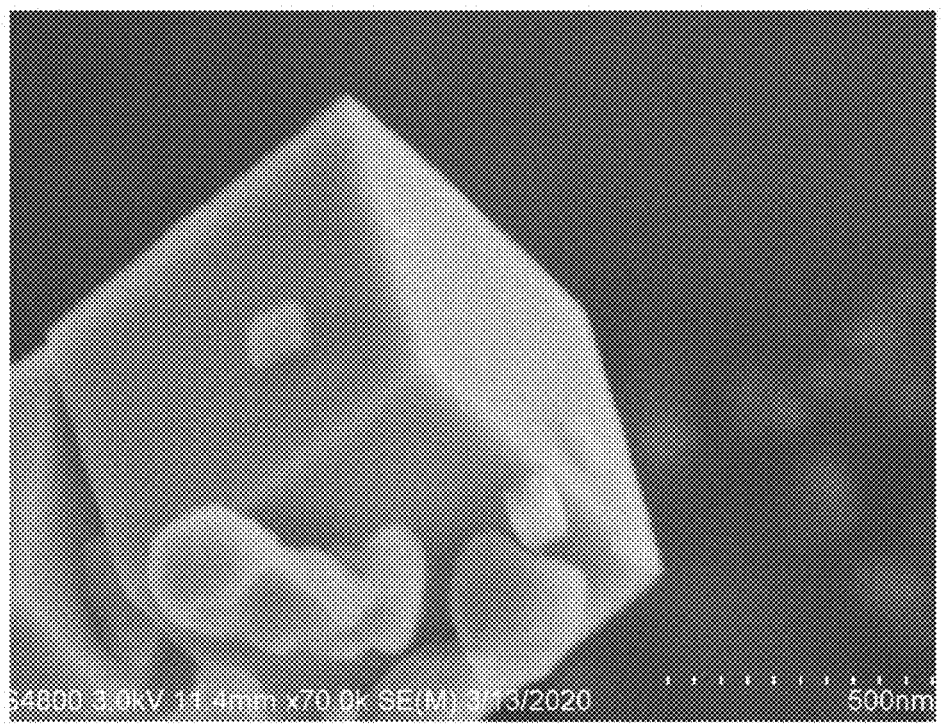
FIG. 15 is an electron micrograph of an SEM image of the hydrogen zirconium phosphate synthesized; the scale bar is 500 nm.
Figure 16:
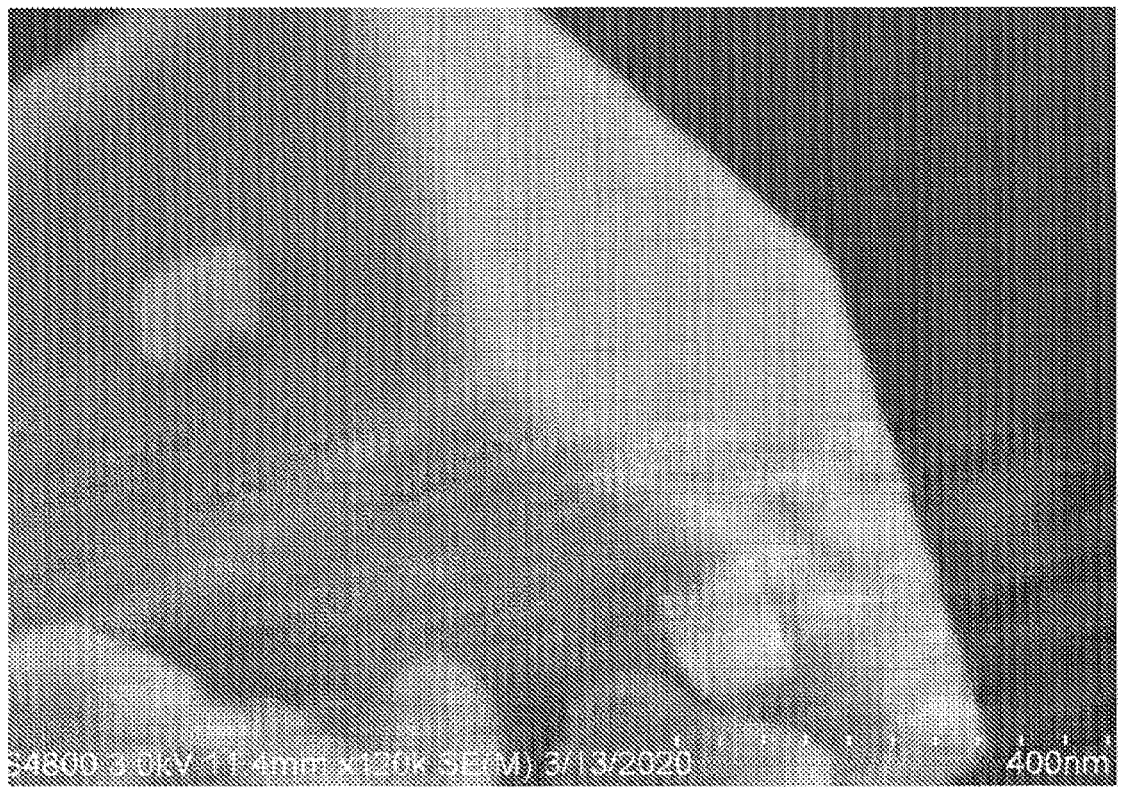
FIG. 16 is an electron micrograph of an SEM image of the hydrogen zirconium phosphate synthesized; the scale bar is 400 nm.
Figure 17:
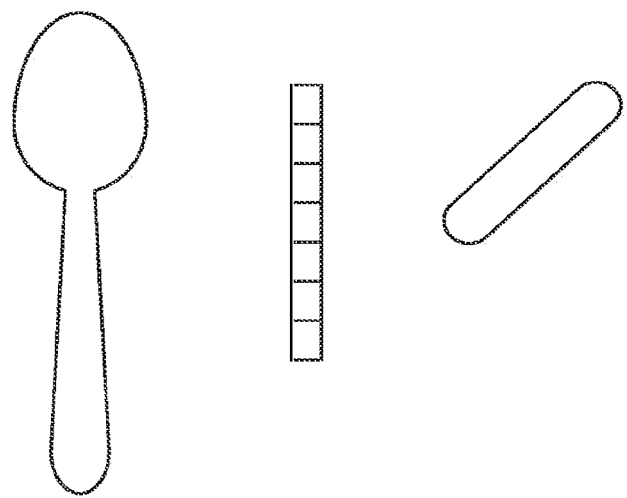
FIG. 17 is a schematic showing a spoon, dipstick, and stir-bar.

The result of this test can be seen in FIG. 6, below.

This test showed that all of the sodium was removed from the chicken broth in only 10 minutes and that sodium removal begins rapidly and proceeds more slowly as time goes on.

REFERENCES

[1] Nakajima, Yasushi, and Isao Yoshida. "Sodium Selective Ion-Exchange Properties of Zirconium Phosphate, HZr2 (PO4)3, and Its Application for the Removal of Sodium Ions." *Analytical Sciences*, vol. 12, no. 6, December 1996, pp. 935-940, doi:10.2116/analsci.12.935.

[2] Keyser, D. J., Guillem, A. F. (2014). U.S. Pat. No. 8,877,255 B2 Retrieved from https://patentimages.storage.googleapis.com/a9/82/68/951427cca7a293/US8877255.pdf

[3] "Health Risks and Disease Related to Salt and Sodium." *The Nutrition Source*, Harvard School of Public Health, 6 Jul. 2016, www.hsph.harvard.edu/nutritionsource/salt-and-sodium/sodium-health-risks-and-disease/.

[4] Semplicini, Andrea. "Faculty of 1000 Evaluation for Worldwide Trends in Blood Pressure from 1975 to 2015: a Pooled Analysis of 1479 Population-Based Measurement Studies with 19.1 Million Participants." *F1000—Post Publication Peer Review of the Biomedical Literature*, 2016, doi:10.3410/f726994163.793525652.

[5] "Heart Disease Facts & Statistics" *Centers for Disease Control and Prevention*, Centers for Disease Control and Prevention, 28 Nov. 2017, www.cdc.gov/heartdiseases/facts.htm.

[6] "Improving Nutrition." *Unilever Global Company Website*, Unilever, www.unilever.com/sustainable-living/improving-health-and-well-being/improving-nutrition/.

Example 4

Food Treatment Version

Zirconium Phosphate powder (and possibly a food-safe buffer) is contained inside a semi-porous bag which is added to food.
1. Add sodium removal device to food or beverage
2. Stir, shake, or otherwise agitate device within food or beverage
3. Removing device from food or beverage
4. Discard, reuse, or recharge device Zirconium Phosphate powder (and possibly a food-safe buffer) is contained inside of a semi-porous, rigid stirring device.
1. Stir device in food or beverage for a prescribed amount of time
2. Discard, reuse, or recharge device Zirconium Phosphate (and possibly a food-safe buffer) is trapped inside of silica, agarose, polymeric, or other semi-porous beads, which are then places in a semi-porous bag and added to food.
1. Add sodium removal device to food or beverage
2. Stir, shake, or otherwise agitate device within food or beverage
3. Removing device from food or beverage
4. Discard, reuse, or recharge device The time the device must be stirred for depends on how much amount of zirconium phosphate is used and how much sodium is contained in the food. Determining the stirring time can be done by taste or by determining how much sodium removal is desired and calculating a stirring time based on that. To all of these versions could be a color indicator that indicates time elapsed or, possibly even capacity left on the zirconium phosphate.

Zirconium Phosphate:

Zirconium Phosphate, $HZr_2(PO_4)_3$ is not the only compound with the ability to selectively remove sodium ions. Without wishing to be bound by theory, there are other zirconium compounds that would perform similarly. The key is that the pores in the ion exchanging crystals act as a molecular sieve, allowing the passage of sodium overwhelmingly more than any other ions. This would likely entail a pore diameter of around 2.1 to 2.7 Angstroms.

EQUIVALENTS

Those skilled in the art will recognize, or be able to ascertain, using no more than routine experimentation, numerous equivalents to the specific substances and procedures described herein. Such equivalents are considered to be within the scope of this invention, and are covered by the following claims.

What is claimed:

1. An ion capturing device comprising a containment apparatus and a substance, wherein the substance is located within the containment apparatus, wherein the substance captures one or more ions, and wherein the substance comprises a compound of formula $M'M''_xA_2B_3O_{12}$ in NZP form where M' comprises a lithium ion, sodium ion, potassium ion, hydrogen ion, hydronium ion, rubidium ion, cesium ion, magnesium ion, calcium ion, strontium ion, barium ion, or a combination thereof;

M" comprises a sodium ion, potassium ion, hydrogen ion, hydronium ion, or a combination;

A comprises tin, germanium, titanium, zirconium, hafnium, aluminum, chromium, nobium, tantalum, scandium, or combinations thereof;

B comprises phosphorous, silicon, aluminum, sulfur, or mixtures thereof; and "x" has a value of 0 to about 3.

2. The ion capturing device of claim 1, wherein the ion comprises a monovalent or polyvalent ion.

3. The ion capturing device of claim 1, wherein the ion comprises a monovalent ion.

4. The ion capturing device of claim 1, wherein the substance captures a sodium ion.

5. The ion capturing device of claim 1, wherein the substance captures an ion through chemical or physical means.

6. The ion capturing device of claim 1, wherein the substance captures an ion through ion-exchange, trapping ions within the crystal structure of the substance, adsorption, or chelation.

7. The ion capturing device of claim 1, wherein the substance comprises hydrogen zirconium phosphate, or $HZr_2(PO_4)_3$.

8. The ion capturing device of claim 1, wherein the substance comprises a powder, a granule, a crystal, a suspension, an emulsion, a solution, or a resin.

9. The ion capturing device of claim 8, wherein the granule comprises a spherical, cylindrical, disk-shaped, or other high surface area granule.

10. The ion capturing device of claim 1, wherein the substance is made by mixture with silica sol, silica beads, polymeric beads, or a gel.

11. The ion capturing device of claim 1, wherein the ion capturing device further comprises a buffering solution or buffering agent.

12. The ion capturing device of claim 1, wherein the containment apparatus is porous, semi-porous, permeable, or semipermeable.

13. The ion capturing device of claim 12, wherein the porosity is less than or equal to one nanometer.

14. The ion capturing device of claim 12, wherein the porosity is greater than about one nanometer.

15. The ion capturing device of claim 1, wherein the containment apparatus comprises fabric, plastic, a membrane, or metal.

16. The ion capturing device of claim 1, wherein the containment apparatus comprises a material through which an ion can pass.

17. The ion capturing device of claim 1, wherein the containment apparatus is rigid or non-rigid.

18. The ion capturing device of claim 1, wherein the containment apparatus is a bag.

19. The ion capturing device of claim 1, wherein the device comprises a spoon, dipstick, or stirring device.

20. The ion capturing device of claim 1, wherein the device is manufactured for use in a food or beverage.

21. The ion capturing device of claim 1, wherein the device is manufactured for use in the manufacture of a food or beverage.

* * * * *